United States Patent [19]
Wiacek et al.

[11] Patent Number: 6,039,407
[45] Date of Patent: Mar. 21, 2000

[54] HUB EXTENDER WITH TOOL CLEARANCE PASSAGEWAYS AND DRIVE NUTS FOR HUB AND BRAKE ASSEMBLY

[75] Inventors: Michael F. Wiacek, Dearborn; Gary L. Koch, Plymouth, both of Mich.

[73] Assignee: Kelsey-Hayes Company, Livonia, Mich.

[21] Appl. No.: 08/802,955

[22] Filed: Feb. 21, 1997

Related U.S. Application Data

[60] Provisional application No. 60/012,026, Feb. 21, 1996.

[51] Int. Cl.[7] ................................................. B60B 27/00
[52] U.S. Cl. ........................................ 301/111; 301/105.1
[58] Field of Search ................................ 301/105.1, 111, 301/36.1

[56] References Cited

U.S. PATENT DOCUMENTS

| | | | |
|---|---|---|---|
| 1,874,192 | 8/1932 | Kay | 301/105.1 |
| 2,653,057 | 9/1953 | Sherman | 301/105.1 |
| 2,826,457 | 3/1958 | Sinclair | 301/36.1 |
| 2,927,823 | 3/1960 | Walther, Sr. | 301/36.1 |
| 3,780,834 | 12/1973 | Lottridge et al. | |
| 3,790,218 | 2/1974 | Johns | 301/36.1 |
| 3,840,273 | 10/1974 | Johns | 301/36.1 |
| 3,933,217 | 1/1976 | Eichinger | |
| 4,124,051 | 11/1978 | Horton | 301/36.1 |
| 4,787,679 | 11/1988 | Arnold | 301/36.1 |
| 4,990,000 | 2/1991 | Harsdorff | 301/105.1 |
| 5,031,967 | 7/1991 | Svensson | 301/105.1 |

FOREIGN PATENT DOCUMENTS

| 9900 | 5/1916 | United Kingdom | 301/36.1 |
|---|---|---|---|

*Primary Examiner*—D. Glenn Dayoan
*Assistant Examiner*—Long Bao Nguyen
*Attorney, Agent, or Firm*—MacMillan, Sobanski & Todd, LLC

[57] ABSTRACT

An improved hub extender for use in a hub and brake assembly includes an inboard flange, an outboard flange, and a main body extending between and interconnecting the inboard flange to the outboard flange. The inboard flange of the hub extender includes a plurality of stud receiving holes formed therein. Each stud receiving hole is adapted to receive a mounting stud and a nut for securing the hub extender to the hub and brake assembly. The outboard flange of the hub extender includes a plurality of tool clearance passageways formed therein. A respective one of the tool clearance passageways is generally coaxially aligned with a respective one of the stud receiving holes thereby enabling a tool to extend through the tool clearance passageway for tightening and/or loosening the associated nut.

19 Claims, 4 Drawing Sheets

HUB EXTENDER WITH TOOL CLEARANCE PASSAGEWAYS AND DRIVE NUTS FOR HUB AND BRAKE ASSEMBLY

CROSS-REFERENCE TO RELATED APPLICATIONS

This application claims the benefit of U.S. Provisional Application No. 60/012,026, filed Feb. 21, 1996.

BACKGROUND OF THE INVENTION

This invention relates in general to vehicle hub and brake assemblies and in particular to an improved hub extender adapted for use in such a vehicle hub and brake assembly.

One example of a known vehicle hub and brake assembly having a hub extender is illustrated in prior art FIG. 1. As shown therein, the vehicle hub and brake assembly, indicated generally at 100, is associated with a driven front wheel of a vehicle and includes a hub 102, a hub extender 104, and a brake rotor 106. The hub 102 includes a generally stepped body having an opened inboard end 108, an opened outboard end 110, and a generally axially extending main body 112. The main body 112 of the hub 102 includes internal splines 112a for receiving mating external splines provided on an axle (not shown) for rotatably connecting the hub 102 to the axle for rotation therewith. The main body 112 of the hub 102 also includes a generally radially outwardly extending flange 114. The flange 114 includes a plurality of circumferentially spaced holes 114a formed therein (only one of such holes 114a is illustrated in FIG. 1).

The hub extender 104 includes an inboard flange 118, an outboard flange 120, and a generally axially extending main body 122. The inboard flange 118 of the hub extender 104 is provided with a plurality of stud receiving holes 118a formed therein (only one of such stud receiving holes 118a is shown in FIG. 1). The outboard flange 120 of the hub extender 104 is provided with a plurality of stud receiving holes 120a formed therein (only one of such stud receiving holes 120a is shown in FIG. 1). The stud receiving holes 120b receive wheel studs 122 and nuts (not shown) for securing a vehicle wheel (not shown) to the flange 120 of the hub extender 104.

To secure the hub 102, rotor 106, and hub extender 104 together for rotation with one another, a plurality of mounting studs 126 (only one of such mounting studs 126 is shown in FIG. 1) and nuts 128 are used. Each of the mounting studs 126 extends through a hole 106a of the rotor 106, the hole 114a of the hub 102, and the hole 118a of the hub extender 104.

SUMMARY OF THE INVENTION

This invention relates to an improved hub extender adapted for use in a hub and brake assembly. The hub extender includes an inboard flange, an outboard flange, and a main body extending between and interconnecting the inboard flange to the outboard flange. The inboard flange of the hub extender includes a plurality of stud receiving holes formed therein. Each stud receiving hole is adapted to receive a mounting stud and a nut for securing the hub extender to the hub and brake assembly. The outboard flange of the hub extender includes a plurality of tool clearance passageways formed therein. A respective one of the tool clearance passageways is generally coaxially aligned with a respective one of the stud receiving holes. As a result, an automated tool spindle assembly can be used to tighten the associated nut on the mounting stud.

Various objects and advantages of this invention will become apparent to those skilled in the art from the following, detailed description of the preferred embodiments, when read in light of the accompanying drawings.

DETAILED DESCRIPTION OF THE PREFERRED EMBODIMENTS

Figure 2:
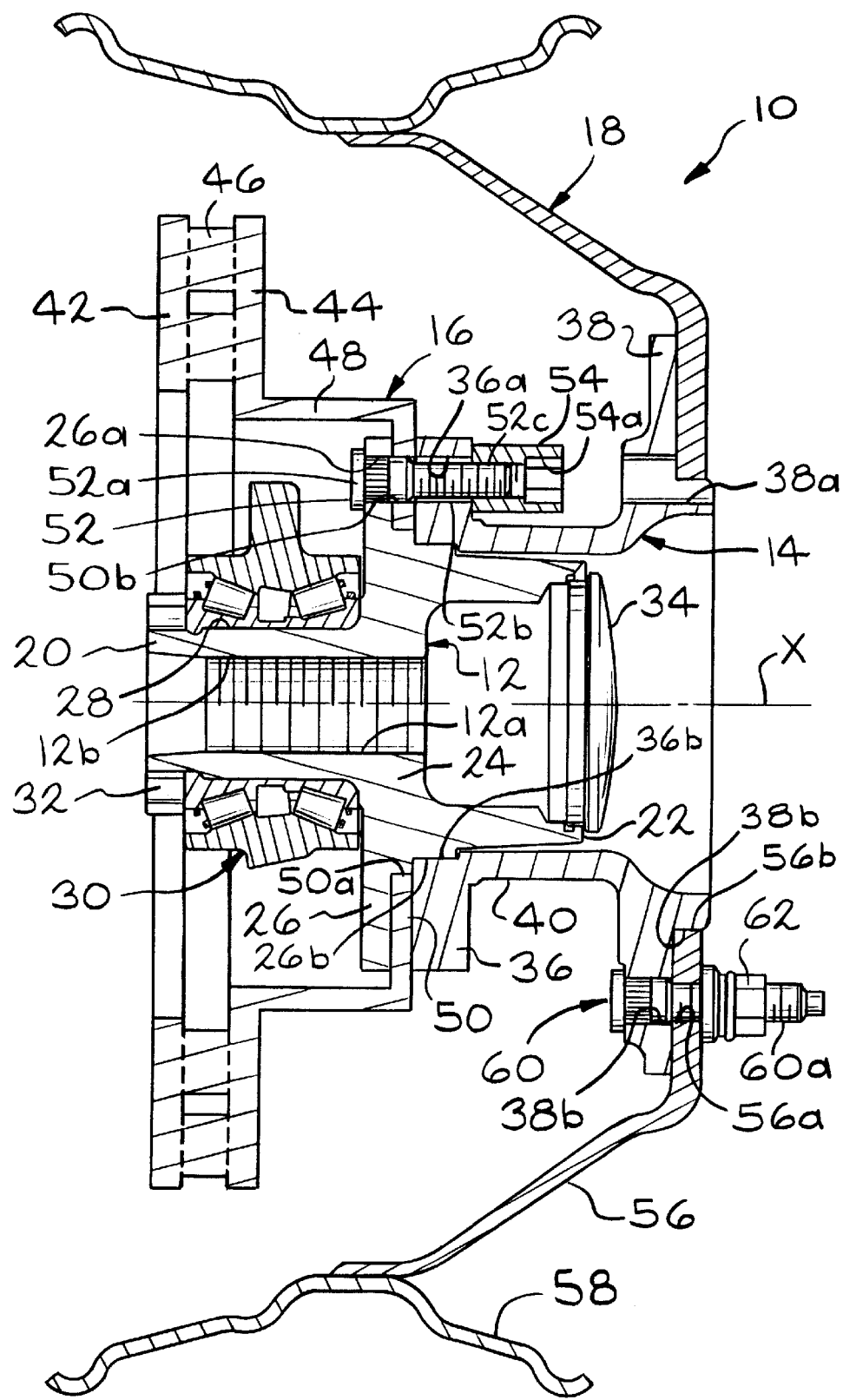
FIG. 2 is a plan view of a portion of a hub and brake rotor assembly including a first embodiment of an improved structure for a hub extender in accordance with this invention.

Referring now to the drawings, there is illustrated in FIG. 2 a portion of a hub and brake rotor assembly, indicated generally at 10. The illustrated hub and brake rotor assembly 10 is associated with a front wheel of a vehicle. The general structure and operation of the hub and brake rotor assembly 10 is conventional in the art. Thus, only those portions of the hub and brake rotor assembly 10 which are necessary for a full understanding of this invention will be explained and illustrated in detail. Although this invention will be described and illustrated in connection with the particular vehicle hub and brake rotor assembly disclosed herein, it will be appreciated that this invention may be used in connection with other vehicle hub assemblies and/or other vehicle brake assemblies.

The hub and brake rotor assembly 10 includes a hub 12, a hub extender 14, a brake rotor 16, and a wheel 18. The hub 12 defines an axis X and includes a generally stepped body having an opened inboard end 20, an opened outboard end 22, and a generally axially extending main body 24. The main body 24 of the hub 12 includes a generally radially outwardly extending flange 26.

The hub 12 is provided with a bearing seat 28 for receiving a bearing assembly 30. A spanner nut 32 is installed on the hub 12 adjacent the inboard end 20 thereof to secure the bearing assembly 30 to the hub 12. The bearing assembly 30 is secured to a non-rotatable component of the vehicle, such as the steering knuckle (not shown) so as to rotatably support the hub 12 relative thereto. The hub 12 also includes an internal bore 12a provided with internal splines 12b for receiving mating external splines provided on an axle (not shown) for rotatably connecting the hub 12 to the axle for rotation therewith. Alternatively, in a non-driven wheel application, the hub 12 does not include the internal bore 12a.

The flange 26 of the hub 12 includes a plurality of circumferentially spaced stud receiving holes 26a formed therein (only one of such stud receiving holes 26a is illustrated in FIG. 2). The outboard end 22 of the hub 12 is adapted to receive a dust cover 34 to prevent dirt, mud, water, and other debris from entering into the interior of the hub 12 through the opened outboard end 22 thereof.

The hub extender 14 includes an inboard flange 36, an outboard flange 38, and a generally axially extending main body 40. The inboard flange 36 of the hub extender 14 is generally annular in shape and provided with a plurality of stud receiving holes 36a formed therein (only one of such stud receiving holes 36a is shown in FIG. 2). The outboard flange 38 of the hub extender 14 is provided with a plurality of tool clearance passageways 38a formed therein (only one of such clearance passageways 38a is shown in FIG. 2). The outboard flange 38 of the hub extender 14 is generally annular shaped and includes a plurality of stud receiving holes 38b formed therein (only one of such stud receiving holes 38b is shown in FIG. 2). As shown in FIG. 2, the inboard flange 36 of the hub extender 14 defines a hub pilot surface 36b for an associated inner surface 26b of the flange 26 of the hub 12. The outboard flange 38 of the hub extender 14 defines a wheel pilot surface 38b for an associated inner surface 56b of a wheel disc 56.

Figure 3:
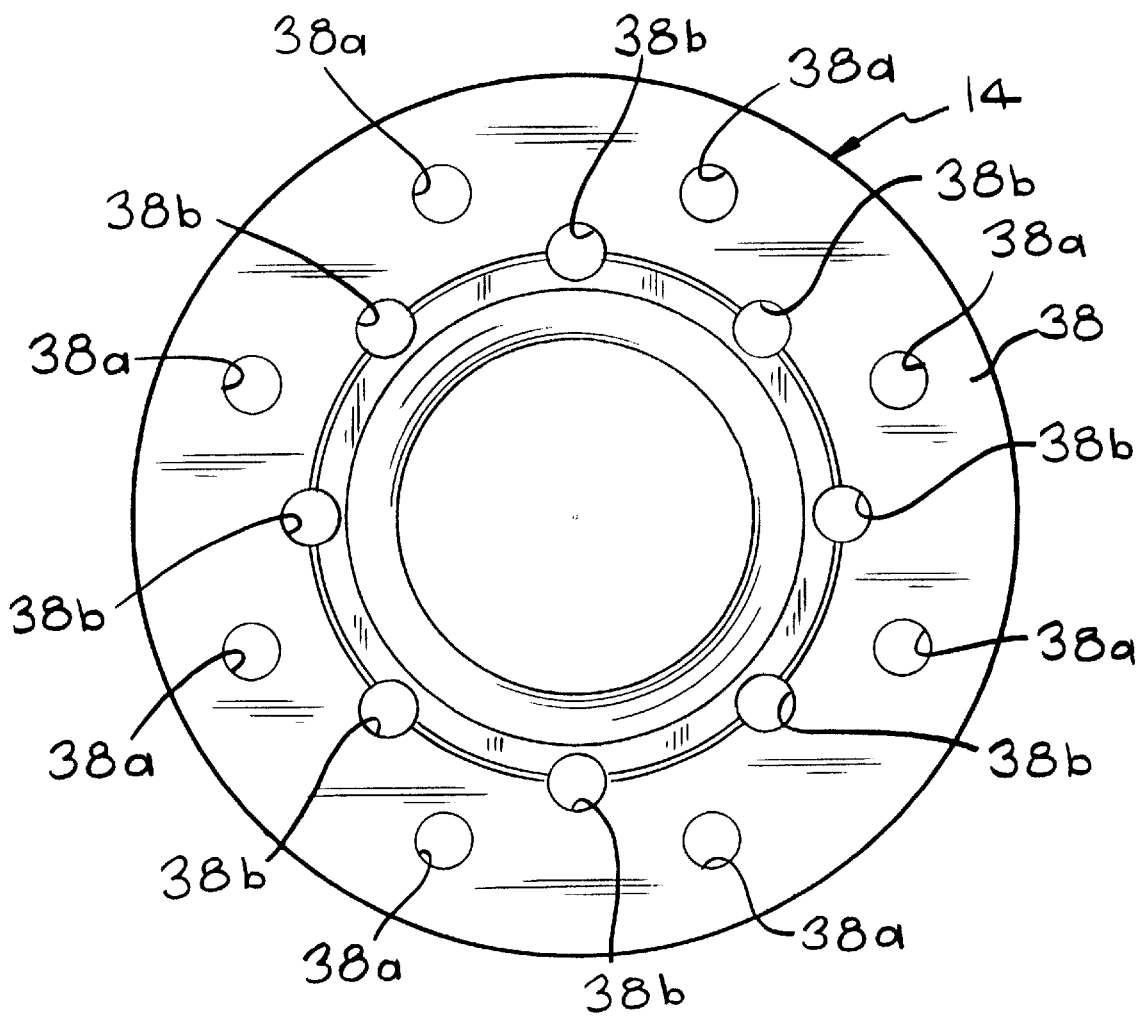
FIG. 3 is a plan view of the inboard flange of the hub extender illustrated in FIG. 2.
Figures 4, 5:
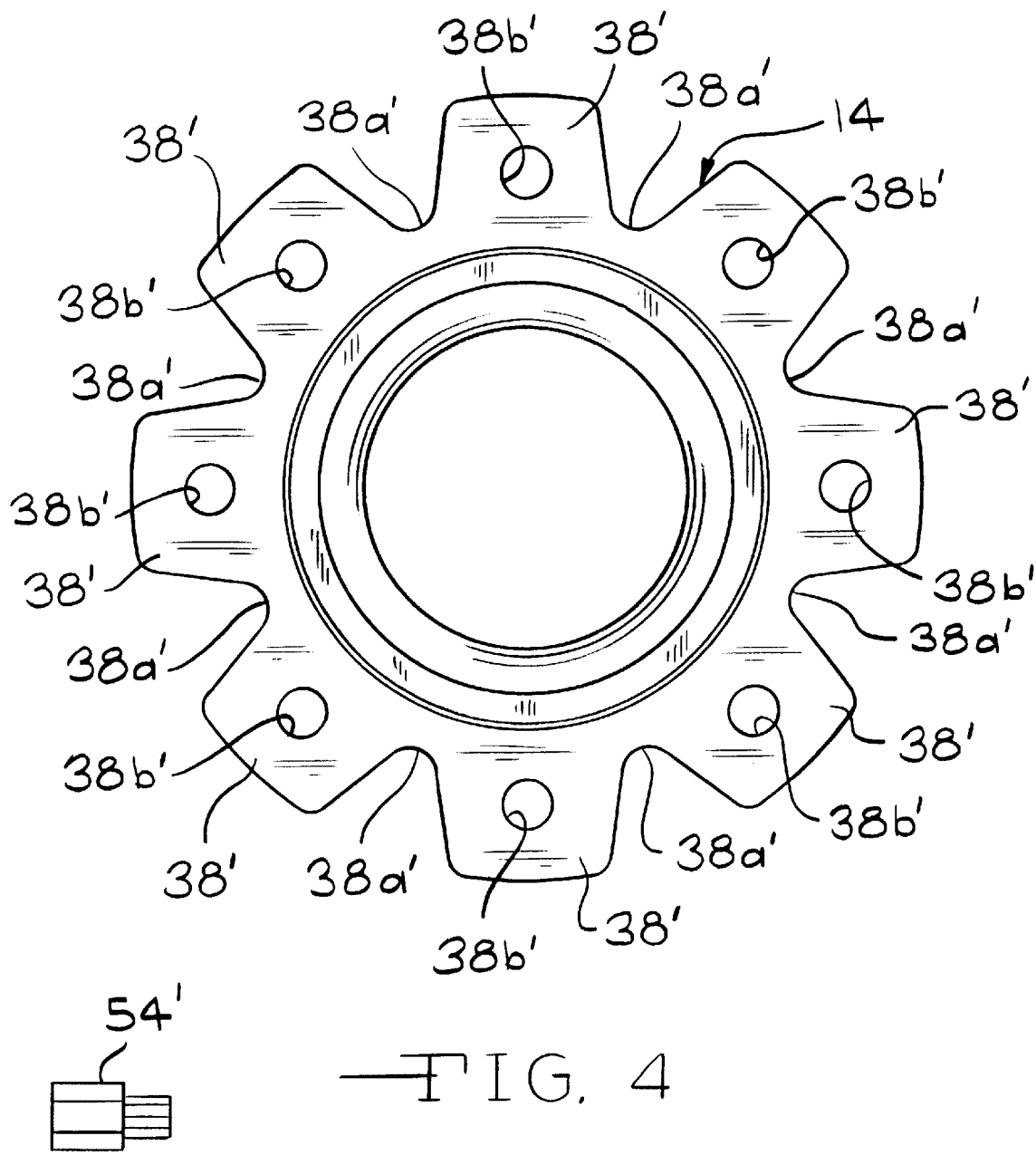
FIG. 4 is a plan view of the inboard flange of a second embodiment of a hub extender in accordance with this invention.
FIG. 5 is a perspective view of an alternative embodiment of a drive nut which can be used with the hub and brake rotor assembly of this invention.

As shown in FIG. 3, the outboard flange 38 of the hub extender 14 is generally annular in shape and includes eight tool clearance passageways 38a. The tool clearance passageways 38a are generally equally spaced circumferentially on the outboard flange 38 of the hub extender 14 radially inwardly to and preferably between each successive pair of stud receiving holes 38b. As will be discussed, the number of tool clearance passageways 38a corresponds to the number of stud receiving holes 36a, and each respective one of the tool clearance passageways 38a is generally coaxially aligned with a respective one of the stud receiving holes 36a. Alternatively, the design of the outboard flange 38 of the hub extender 14 and/or the tool clearance passageways 38a can be varied if desired. For example, as shown in FIG. 4, the outboard flange 38 of the hub extender 14 can have a generally scallop-like shape wherein a tool clearance passageway 38a' is defined between each successive adjacent flange portions 38'. Also, as shown in FIG. 4, the associated tool clearance passageways 38a' are radially aligned with the stud receiving holes 38b'. Alternatively, the associated tool clearance passageways 38a and 38a' can be spaced radially outwardly relative to the stud receiving holes 38b.

The brake rotor 16 is ventilated and includes a pair of opposed friction plates 42 and 44 which are spaced apart from one another by a plurality of intermediate ribs or posts 46 in a well known manner. The friction plate 44 of the rotor 16 is connected by a circumferentially extending wall 48 to an inner mounting flange portion 50. The inner mounting flange portion 50 of the rotor 16 includes a centrally located pilot hole 50a, and a plurality of stud receiving holes 50b (only one of such stud receiving holes 50b is shown in FIG. 2) equally spaced circumferentially on the rotor 16 about the pilot hole 50a.

A mounting stud 52 is provided to secure the hub 12, the rotor 16, and the hub extender 14 together for rotation with one another. Each mounting stud 52 includes an enlarged inner head 52a, a main body 52b provided with serrations formed along a portion thereof, and a threaded outer end 52c. The mounting stud 52 extends through the hole 26a formed in the flange 26 of the hub 12, the hole 50b formed in the flange portion 50 of the rotor 16, and the hole 36a formed in the flange 36 of the hub extender 14. The serrations of the main body 52b of the mounting stud 52 frictionally engage a side wall of the hub hole 26a to secure the stud 52 to the hub 12.

Figure 1:
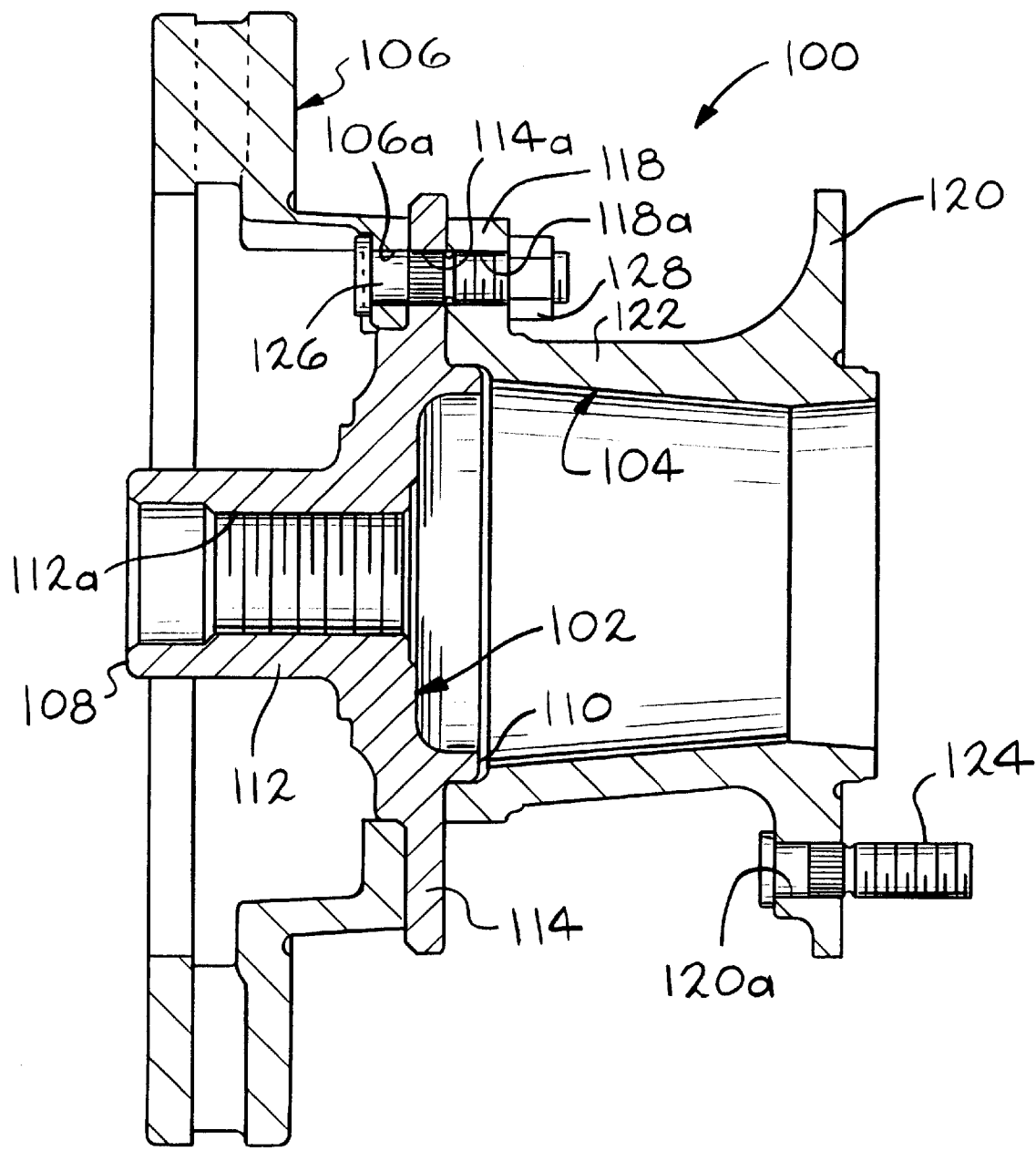
FIG. 1 is a sectional view of a portion of a prior art vehicle hub and brake rotor assembly including a hub extender.

An internal drive nut 54 is threadably installed on the threaded outer end 52c of the mounting stud 52 to secure the hub 12, the rotor 16, and the hub extender 14 together for rotation with one another. To accomplish this, the drive nut 54 is initially threaded onto the threaded outer end 52c of the mounting stud 52 by a manual hand operation. Then, a suitable tool (not shown), extends through the tool clearance passageway 38a of the hub extender 14. The tool includes an end (not shown) which is received in an opening 54a of the drive nut 54 so as to enable the tool to threadably tighten drive nut 54 onto the mounting stud 52 and down against the inboard flange 36 of the hub extender 14 to a predetermined torque. Alternatively, other types of nuts 54 can be used if desired. For example, the nut 54 can be an external drive nut 54' as shown in FIG. 5, or a conventional nut 128 as shown in FIG. 1.

The wheel 18 includes an inner disc 56 and an outer rim 58 connected together in a well known manner. The inner disc 56 includes a plurality of wheel mounting stud receiving holes 56a formed therein (only one of such wheel mounting stud receiving holes 56a is shown in FIG. 2). The number of wheel mounting stud receiving holes 56a formed in the wheel 18 corresponds to the number of wheel mounting stud receiving holes 38b formed in the hub extender 14. A wheel mounting stud 60 extends through the mounting stud receiving hole 38b of the hub extender 14 and the mounting stud receiving hole 56a of the wheel 18. A nut 62 is installed on a threaded outer end 60a of the wheel mounting stud 60 to thereby secure the wheel 18 to the hub extender 14 for rotation therewith.

One advantage of this invention is that by providing a tool clearance passageway 38a or 38a' in the outboard flange 38 of the hub extender 14, after the nut 54 is initially threaded onto the stud 52 by hand, an automated tool spindle assembly (not shown) can be used to further tighten the nut 54 onto the mounting stud 52. Also, after vehicle operation, the nuts 54 tend to become seized and rather difficult to remove. The tool clearance passageways 38a thus allow an air operated tool to be used to remove the nuts 54 from the mounting studs 52. As shown in prior art FIG. 1, no tool clearance passageway is provided in an outboard flange 120 of a hub extender 104. Thus, the nut 128 not only is installed on the mounting stud 126 by a manual hand operation, but also is removed from the stud 126 by a manual hand operation thereby not enabling the use of an air operated tool.

Although the invention has been described and illustrated in the context of a hub and brake rotor assembly 10, it will be appreciated that this invention may be used in other types of brake assemblies. For example, this invention may be used in a hub and brake drum assembly (not shown).

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A hub extender for use in a hub, wheel and brake assembly comprising:

an inboard flange, an outboard flange, and a main body extending between and interconnecting said inboard flange to said outboard flange, said inboard flange including at least one stud receiving hole formed therein to receive a mounting stud and a nut for securing said hub extender to the hub, wheel and brake assembly, said outboard flange including at least one tool clearance passageway formed therein, said tool clearance passageway being generally coaxially aligned with said stud receiving hole to enable a tool to extend through said tool clearance passageway for manipulating the nut, said inboard flange of said hub extender defining a hub pilot surface for an associated inner surface of the hub, and said outboard flange of said hub extender defining a wheel pilot surface for an associated surface of the wheel.

2. The hub extender defined in claim 1 wherein said outboard flange is generally annular in shape and includes a plurality of tool clearance passageways formed therein.

3. The hub extender defined in claim 2 wherein said inboard flange is generally annular in shape and includes a plurality of stud receiving holes formed therein, said plurality of tool clearance passageways being generally equally spaced circumferentially on said outboard flange between each successive pair of said plurality of stud receiving holes, said plurality of tool clearance passageways being generally coaxially aligned with a respective one of said plurality of stud receiving holes.

4. The hub extender defined in claim 3 wherein said outboard flange includes a plurality of stud receiving holes formed therein to receive bolts and nuts for securing the wheel to said outboard flange of said hub extender.

5. The hub extender defined in claim 3 wherein said plurality of stud receiving holes are spaced radially outwardly relative to said plurality of tool clearance passageways.

6. The hub extender defined in claim 1 wherein said outboard flange is generally scallop-like in shape and includes a plurality of tool clearance passageways formed therein.

7. The hub extender defined in claim 6 wherein said inboard flange is generally annular in shape and includes a plurality of stud receiving holes formed therein, said plurality of tool clearance passageways being generally equally spaced circumferentially on said outboard flange between each successive pair of said plurality of stud receiving holes, said plurality of tool clearance passageways being generally coaxially aligned with a respective one of said plurality of stud receiving holes.

8. The hub extender defined in claim 7 wherein said outboard flange includes a plurality of stud receiving holes formed therein to receive bolts and nuts for securing the wheel to said outboard flange of said hub extender.

9. The hub extender defined in claim 8 wherein said plurality of stud receiving holes are spaced radially outwardly relative to said plurality of tool clearance passageways.

10. The hub extender defined in claim 1 wherein said outboard flange includes at least one stud receiving hole formed therein.

11. The hub extender defined in claim 10 wherein said at least one stud receiving hole is spaced radially outwardly relative to said at least one tool clearance passageway.

12. A hub and brake assembly comprising:

a hub defining an axis and including a generally stepped body having an opened inboard end, an opened outboard end, and a generally axially extending main body, said main body including a generally radially outwardly extending flange having a plurality of circumferentially spaced stud receiving holes, said main body defining a bearing surface;

a bearing assembly rotatably disposed on said bearing surface of said hub, said bearing assembly to be secured to a non-rotatable vehicle component so as to rotatably support said hub relative to said bearing assembly;

a rotatable brake component secured to said hub, said rotatable brake component including a mounting flange having a plurality of stud receiving holes formed therein;

a hub extender secured to said hub and said rotatable brake component, said hub extender including an inboard flange, an outboard flange, and a main body extending between and interconnecting said inboard flange to said outboard flange, said inboard flange including a plurality of stud receiving holes formed therein, said outboard flange including a plurality of tool clearance passageway formed therein, a respective one of said plurality of tool clearance passageways being generally coaxially aligned with a respective one of said plurality of stud receiving holes, said inboard flange of said hub extender defining a hub pilot surface for an associated inner surface of said hub, and said outboard flange of said hub extender defining a wheel pilot surface for an associated surface of the wheel;

a mounting stud extending through a respective one of said stud receiving holes formed in said hub, said rotatable brake component, and said hub extender, said mounting stud including an enlarged inner head, a main body, and a threaded outer end; and a nut threadably installed on said threaded outer end of said mounting stud for rotatably connecting said hub, said rotatable brake component, and said hub extender together with one another.

13. The hub and brake assembly defined in claim 12 wherein said nut is an internal drive nut.

14. The hub and brake assembly defined in claim 12 wherein said nut is an external drive nut.

15. The hub and brake assembly defined in claim 12 wherein said outboard flange of said hub extender is generally scallop-like in shape.

16. The hub and brake assembly defined in claim 12 wherein said outboard flange of said hub extender includes a plurality of stud receiving holes formed therein to receive bolts and nuts for securing the wheel to said outboard flange of said hub extender.

17. The hub and brake assembly defined in claim 16 wherein said plurality of stud receiving holes formed in said outboard flange of said hub extender are spaced radially outwardly relative to said plurality of tool clearance passageways formed in said outboard flange of said hub extender.

18. The hub and brake assembly defined in claim 16 wherein a respective one of said plurality of tool clearance passageways formed in said outboard flange of said hub extender are generally equally spaced circumferentially on said outboard flange between each successive pair of said plurality of stud receiving holes formed in said outboard flange of said hub extender.

19. The hub and brake assembly defined in claim 12 wherein said rotatable brake component is a brake rotor.

\* \* \* \* \*